June 19, 1951  G. W. DAGGETT  2,557,598
DISK TYPE LAWN MOWER
Filed Oct. 17, 1947  7 Sheets-Sheet 2
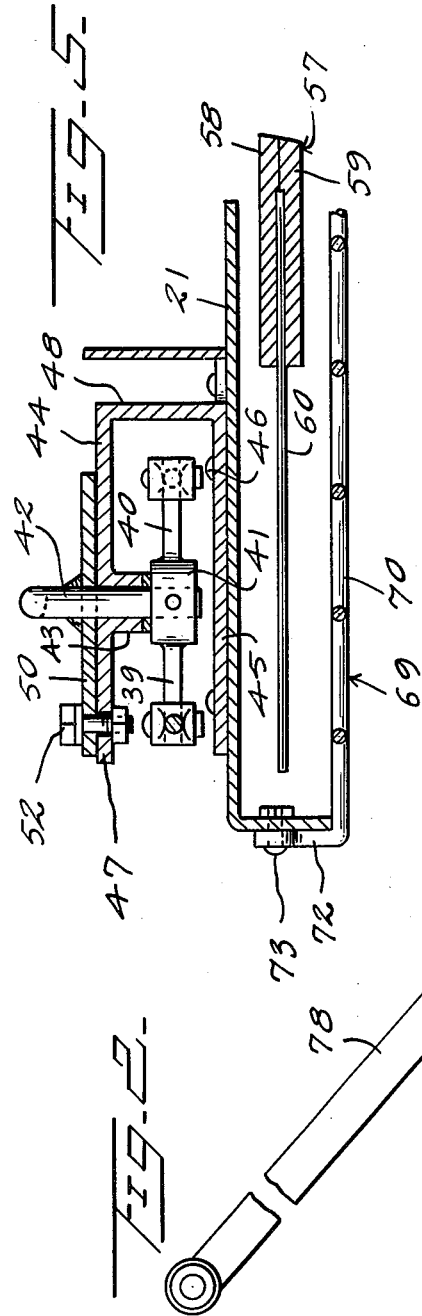
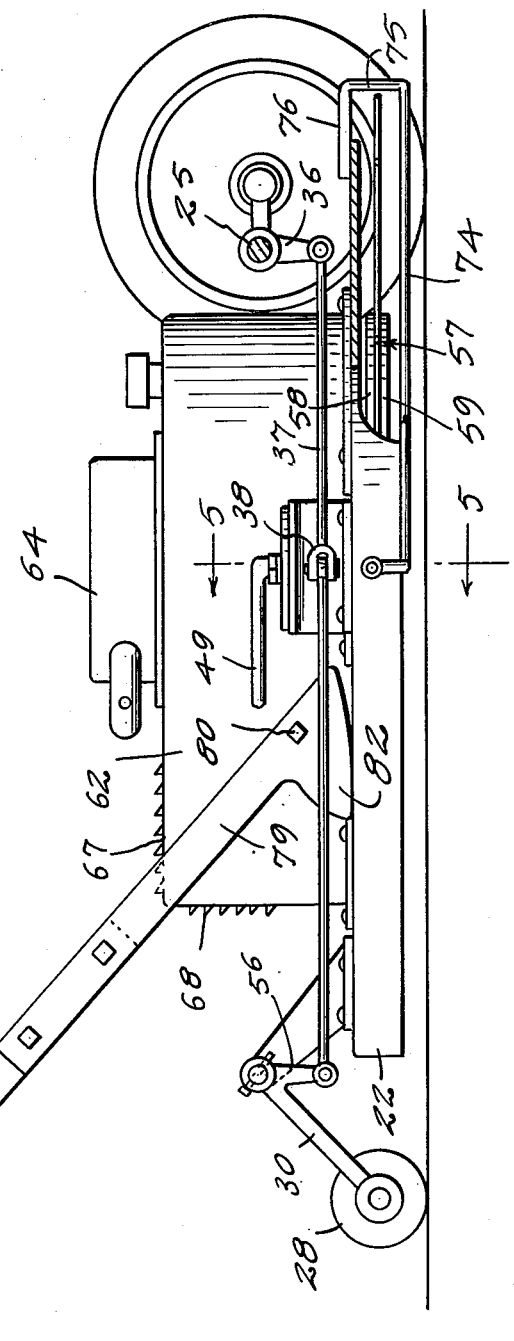
INVENTOR.
G. W. Daggett
BY
Kimmel & Crowell Attys.

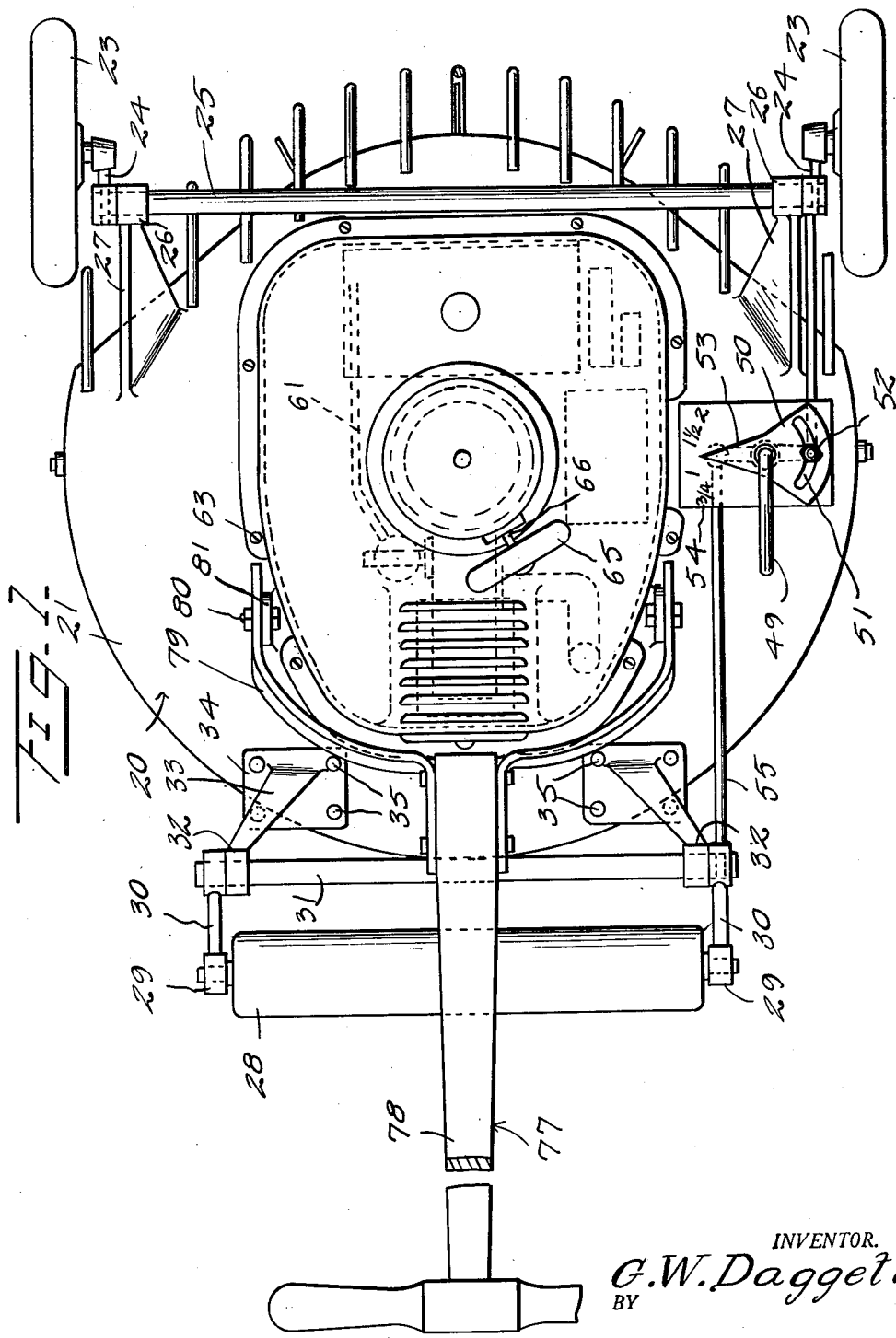

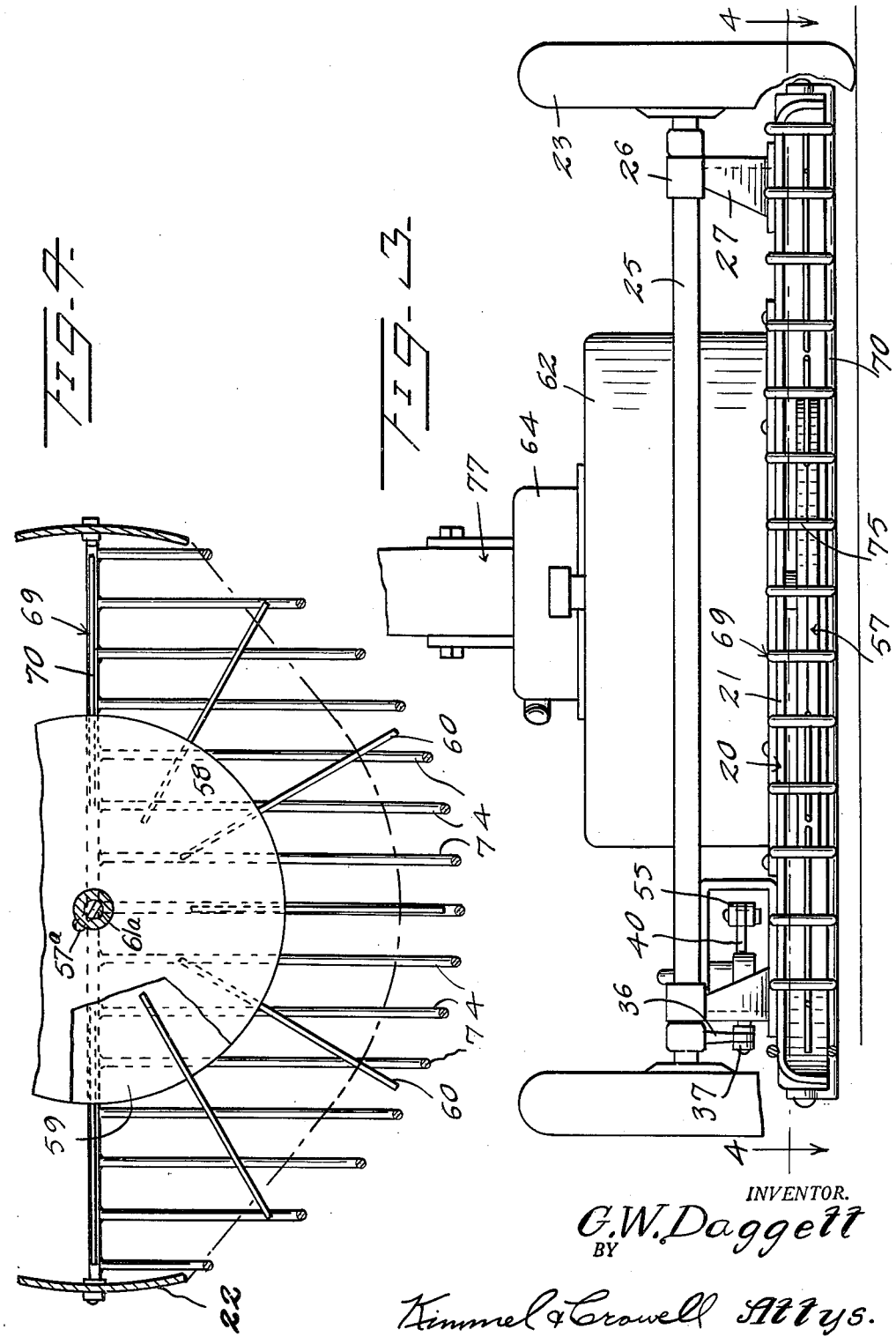

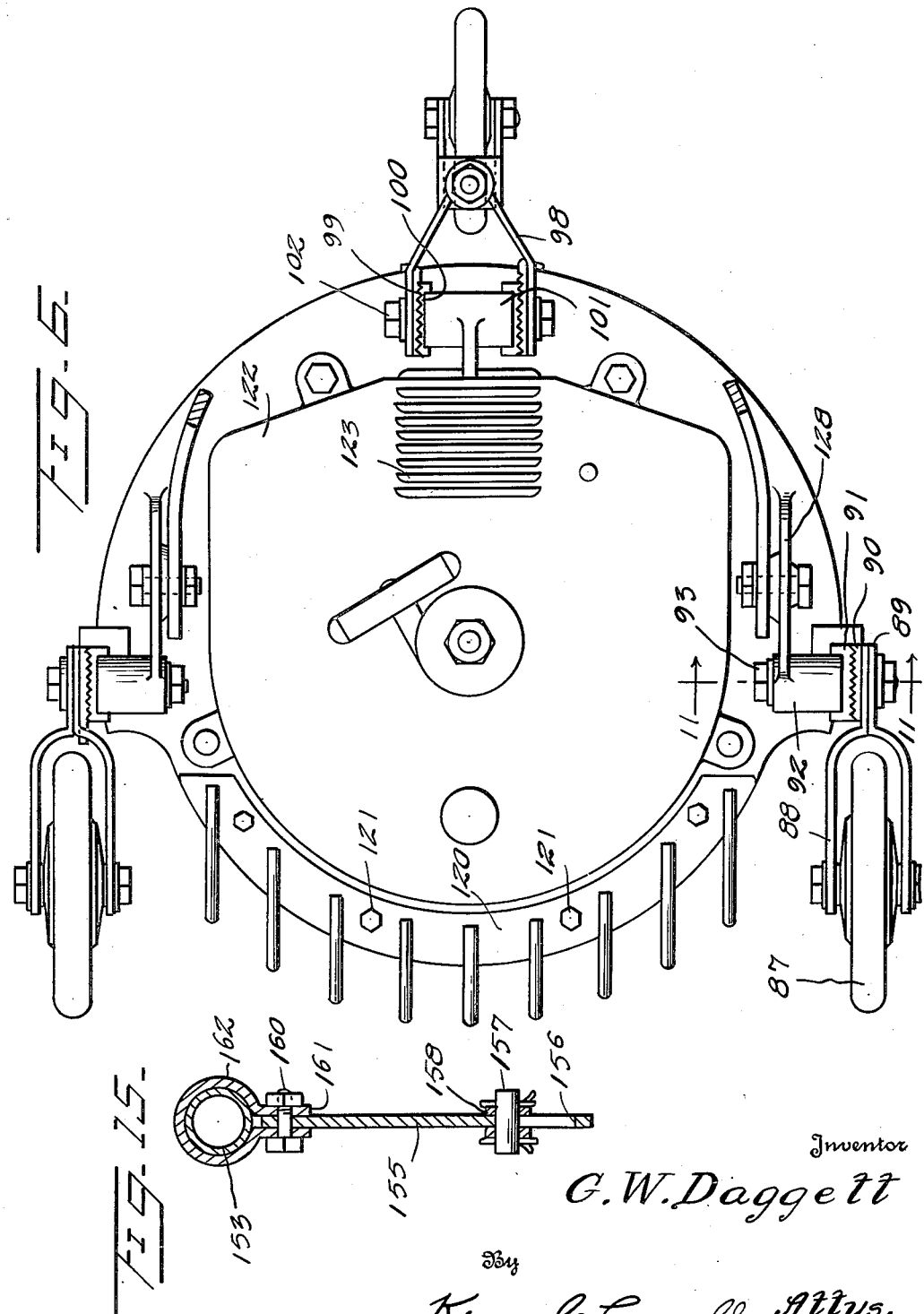

June 19, 1951 — G. W. DAGGETT — 2,557,598
DISK TYPE LAWN MOWER
Filed Oct. 17, 1947 — 7 Sheets-Sheet 5
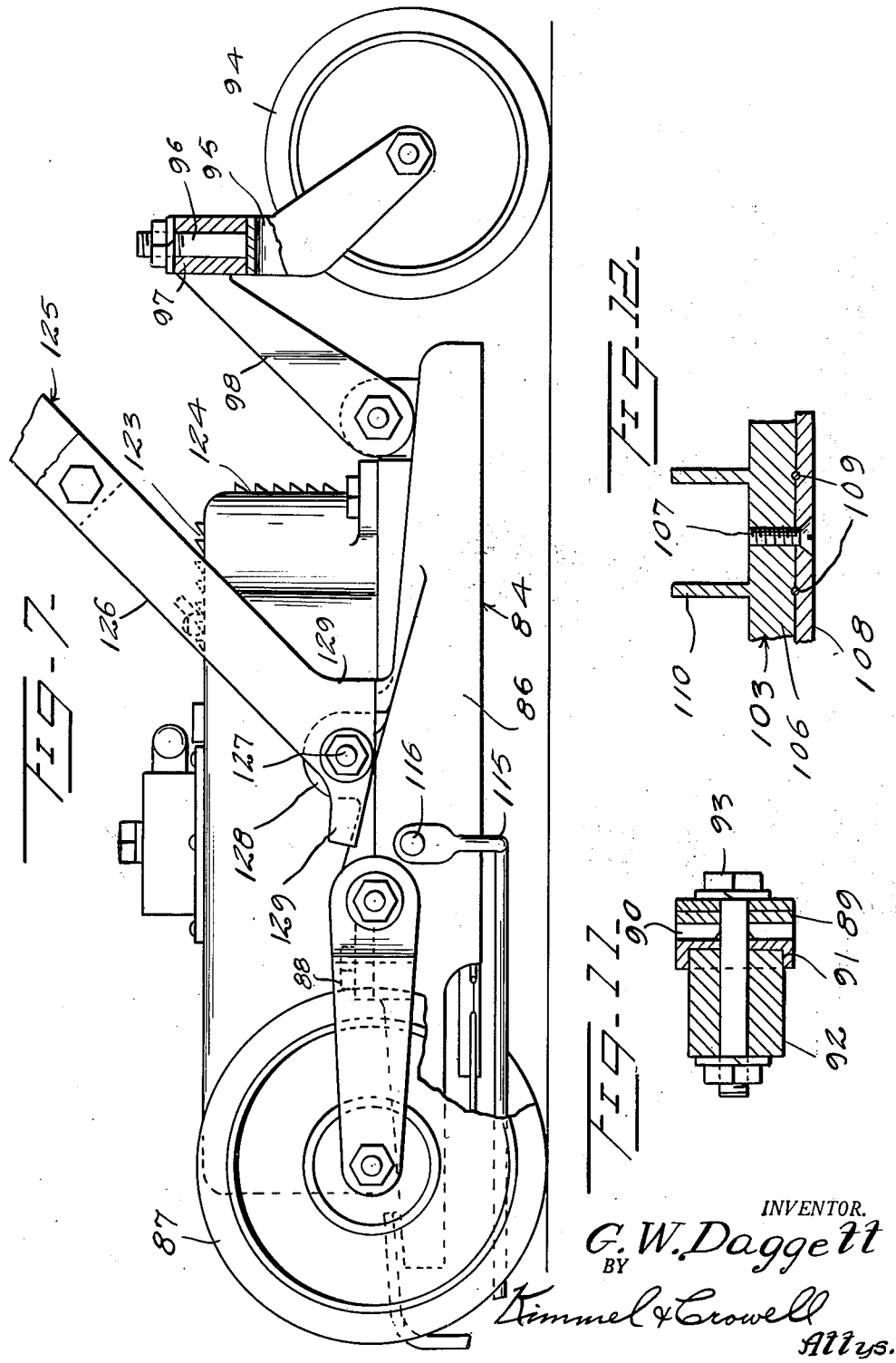
INVENTOR.
G. W. Daggett
BY Kimmel & Crowell
Attys.

June 19, 1951 G. W. DAGGETT 2,557,598
DISK TYPE LAWN MOWER
Filed Oct. 17, 1947 7 Sheets-Sheet 6
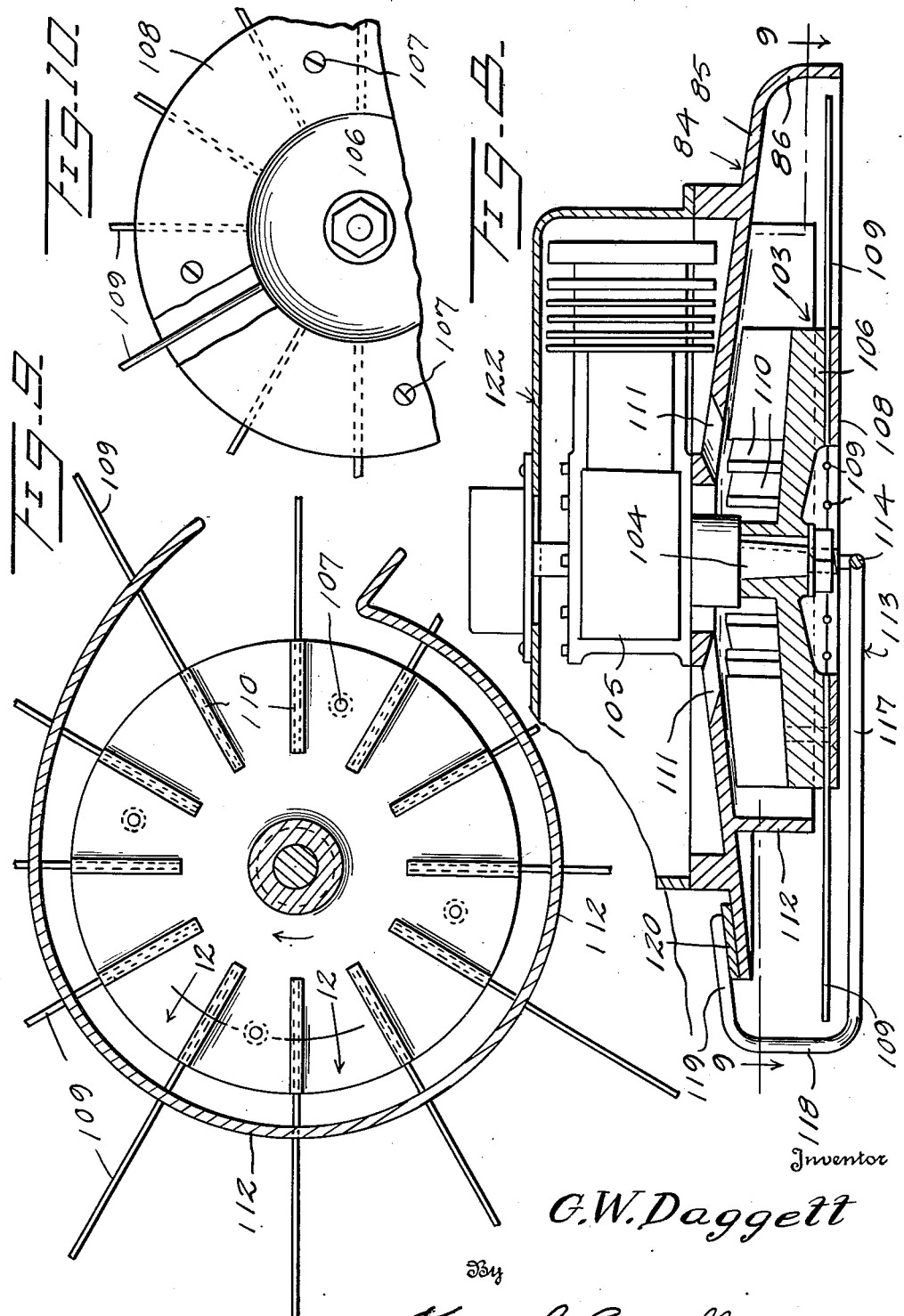
Inventor
G. W. Daggett
By
Kimmel & Crowell Attys.

June 19, 1951 G. W. DAGGETT 2,557,598
DISK TYPE LAWN MOWER
Filed Oct. 17, 1947 7 Sheets-Sheet 7
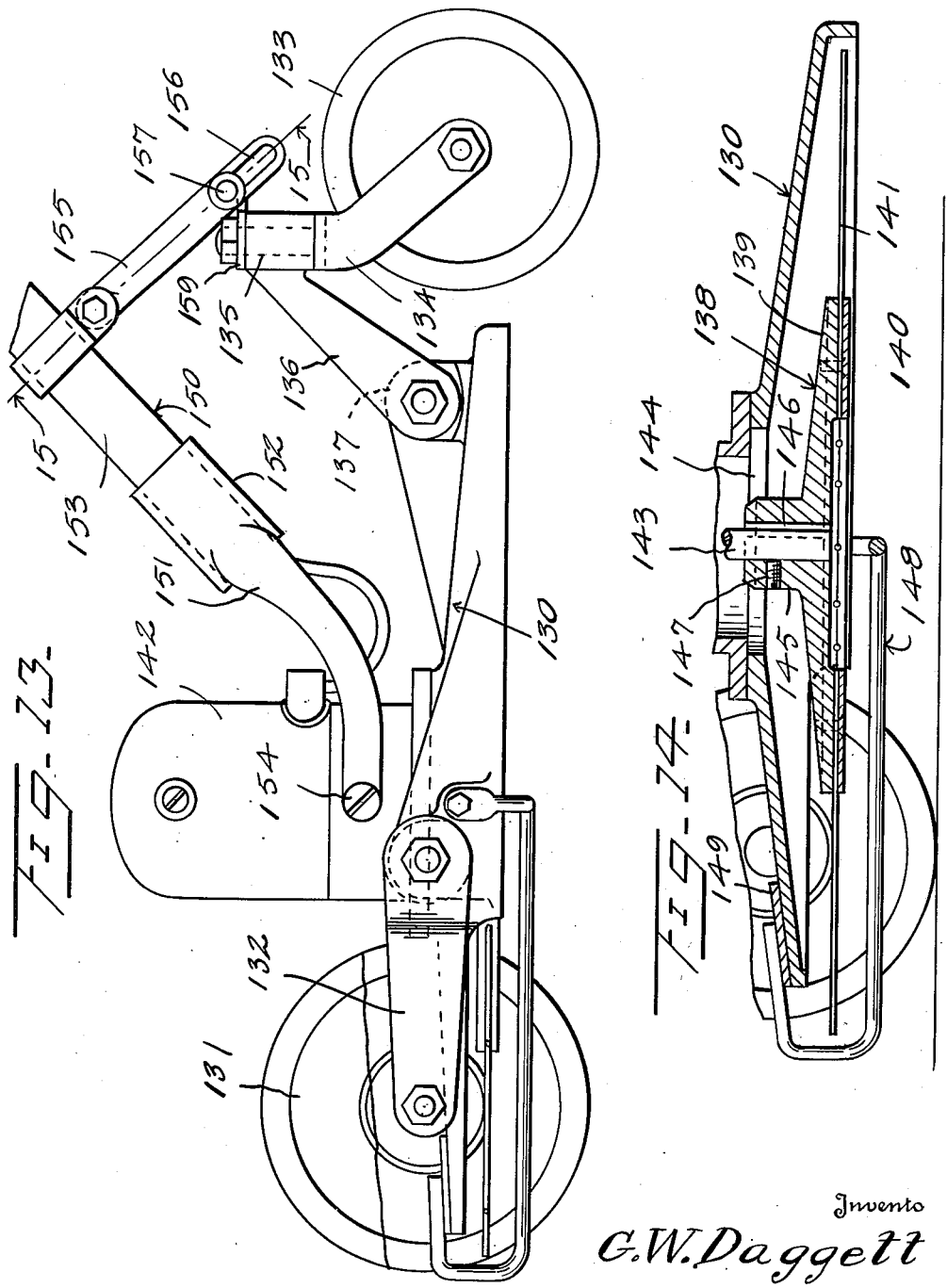
Inventor
G. W. Daggett
By
Kimmel & Crowell Attys.

Patented June 19, 1951

2,557,598

UNITED STATES PATENT OFFICE 2,557,598

DISK TYPE LAWN MOWER

George W. Daggett, Meadville, Pa.

Application October 17, 1947, Serial No. 780,391

3 Claims. (Cl. 56—25.4)

This invention relates to lawnmowers.

An object of this invention is to provide a lawnmower with a power unit for operating the rotary cutter and the cutter being formed of radial blades or wires having a vertical axis.

Another object of this invention is to provide a lawnmower of the self-contained power type having an improved rotary cutter formed of a central disc-shaped hub and a plurality of radially disposed cutting wires.

A further object of this invention is to provide a powered lawnmower with an improved means for regulating the height of cutting of the grass.

A further object of this invention is to provide a powered lawnmower which is of simple construction and embodies only one cutter blade of the rotary type having replaceable cutting wires and including a combined front and bottom guard which will prevent the blade from striking objects on the ground.

A further object of this invention is to provide a powered lawnmower which can be powered either by an electric motor or by an internal combustion engine.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a detailed plan view of a power lawnmower, constructed according to an embodiment of this invention.

Figure 2 is a detailed side elevation, partly broken away and in section, of the device.

Figure 3 is a detailed enlarged front elevation, partly broken away, of the device.

Figure 4 is a fragmentary sectional view taken substantially on the line 4—4 of Figure 3 and having the same scale as that of Figure 1.

Figure 5 is a fragmentary enlarged sectional view taken substantially on the line 5—5 of Figure 2.

Figure 6 is a plan view of a modified form of this invention.

Figure 7 is a detailed enlarged side elevation, partly broken away, of the device shown in Figure 6.

Figure 8 is a fragmentary longitudinal section of the device shown in Figures 6 and 7.

Figure 9 is a fragmentary sectional view taken on the line 9—9 of Figure 8.

Figure 10 is a fragmentary bottom plan of the rotary cutter shown in Figure 8.

Figure 11 is a fragmentary enlarged sectional view taken on the line 11—11 of Figure 6.

Figure 12 is a fragmentary enlarged sectional view taken on the line 12—12 of Figure 9.

Figure 13 is a detailed side elevation, partly broken away, of another modified form of this invention.

Figure 14 is a fragmentary vertical section taken longitudinally through the device shown in Figure 13.

Figure 15 is a sectional enlarged view taken on the line 15—15 of Figure 13.

Referring to the drawings and first to Figures 1 to 5, inclusive, the numeral 20 designates generally a frame or supporting body which in the present instance is constructed in the form of a substantially flat plate 21 which is provided with an arcuate marginal edge having a depending flange 22 extending partly about the plate 21. The flange 22 is interrupted at the front end of the plate 21 and the front end of the plate 21 is constructed in the form of a parabola. The frame 20 is supported for movement over the surface of the ground by means of a pair of front wheels 23 which are rotatably carried by crank arms 24 fixed to a transversely extending shaft 25. The shaft 25 is journalled through a pair of bearings 26 which are supported forwardly of the plate 21 by means of a pair of supporting webs or braces 27 which are fixed to and extend forwardly and upwardly from the plate 21.

A roller 28 is disposed at the rear of the device being journalled through a pair of bearings 29 carried by arms 30 which are fixed to a rear roller shaft 31. The roller shaft 31 is journalled through a pair of bearings 32 carried by bracket arms 33 including plates 34 which are fixed by fastening members 35 to the plate 21 at the rear thereof.

In order to provide for the raising and lowering of the frame 20 so as to regulate the cutting height of the rotary cutter, to be hereinafter described, I have provided an arm 36 which is fixed to the front shaft 25 and a link 37 is connected to the lower end of the arm 36 and is provided at its rear end with a fork 38 which is pivotally connected to an adjusting lever 39. The lever 39 includes an aligning lever 40 extending oppositely from the hub or bushing 41 thereof and an adjusting shaft 42 is fixed to the hub or bushing 41 and extends upwardly through a bearing 43 which is carried by a U-shaped bearing supporting member 44.

The bearing supporting member 44 includes a base plate 45 which is fixed by fastening means 46 to the upper side of the plate 21 and also includes an upper plate or arm 47 connected to the lower plate 45 by a vertical connecting plate 48. The bearing 43 is carried by the upper plate 47. The shaft 42 includes a handle 49 by means of which the shaft 42 may be rotated to swing the levers 39 and 40 and thereby adjust the height of the frame 20 relative to the ground. The shaft 42 has fixed thereto an index plate 50 which is disposed on the upper side of the plate 47 and the plate 50 is provided with an arcuate slot 51 through which a locking bolt 52 extends. The plate 50 includes a pointer 53 which swings across graduations or indicia 54 disposed on the upper side of the plate 47. The bolt 52 extends through the index plate 50 and also through the plate 47 so that tightening of the bolt 52 will lock the plate 50 and the shaft 42 to the plate 47. The lever 40 has connected thereto the front end of a roller adjusting link 55 and the rear end of the link 55 is connected to an arm 56 which is fixed relative to one of the bearing arms 30 as shown in Figure 2.

A rotary cutter generally designated as 57 is disposed within the lower side of the frame or guard 20 and includes a disc-shaped upper plate 58 which has secured thereto a lower blade clamping plate 59. A plurality of radially disposed cutting members 60 in the form of wires are clamped between the two plates 58 and 59 and project from the outer marginal edges of these plates so that when the cutter 57 is rotated the blades or wires 60 will cut the grass which projects upwardly into the forward end of the frame or guard 20. The cutter 57 is fixed by a set-screw 57a, or any other similar well known means, to the crank shaft 61a of an internal combustion engine 61 disposed horizontally on the upper side of the frame or guard 20. The engine 61 has disposed thereabout a cover 62 which is secured by fastening means 63 to the upper side of the plate 21. The cover 62 includes a housing 64 and a starting handle 65 is disposed adjacent the cover 64 and has secured thereto a flexible starting cord 66 which is connected in a conventional manner to the crank shaft of the engine. The cover 62 is formed with louvers 67 on the upper side thereof and also with louvers 68 on the rear side thereof to provide for cooling of the engine 61. A wire guard generally designated as 69 engages partly beneath the frame or guard 20 and projects forwardly from the center of the frame. The wire guard 69 includes a horizontally disposed bar 70 which is formed at the opposite ends thereof with upturned arms 72 which are secured by fastening means 73 to the outer side of the flange 22.

The bar 70 engages beneath the cutter 57 and has fixed thereto a plurality of forwardly projecting bars 74 which include vertically disposed forward ends 75 and rearwardly projecting terminal ends 76. The ends 76 are disposed in substantially parallel relation to the bars 74 and engage over the upper side of the plate 21.

A handle 77 is secured to the frame 20 and includes an elongated bar 78 which has secured to the forward lower end thereof a pair of longitudinally bent bars 79 which are pivotally secured on pivots 80 extending through upturned ears 81 carried by the plate 21. The bars 79, as shown in Figure 2, have fixed thereto stop lugs 82 which engage the upper side of the plate 21 so as to thereby limit the rearward and downward rocking of the handle 77.

Referring now to Figures 6 to 12, inclusive, there is disclosed a slightly modified form of this invention. A frame 84 is provided similar to the frame 20 including a plate 85 having a depending marginal flange 86 which is interrupted at the forward end of the frame 84. The frame 84 has disposed at the forward end thereof a pair of wheels 87 which are rotatably disposed between a fork 88. The fork 88 includes a shank 89 having a toothed plate 90 fixed relative thereto which is disposed in confronting position to a stationary tooth 91 carried by a boss 92. A bolt 93 extends through the boss 92 and through the shank 89 so that the fork 88 may be selectively adjusted vertically in order to provide for raising or lowering of the frame 84. In the present instance the two front wheels 87 are separately adjustable.

A rear wheel 94 is carried by a fork 95 having a shank 96 which is journalled in a bearing 97. The bearing 97 has fixed thereto and extending forwardly and downwardly therefrom a pair of arms 98 which at their forward lower ends are provided with toothed plates 99. The plates 99 are disposed in confronting position relative to toothed plates 100 which are fixed relative to a boss 101 carried by the frame 84. A bolt 102 extends through the arms of the fork 98 and through the boss 101 so as to adjustably lock the fork 98 in selected position. The frame or guard 84 has rotatably disposed in the lower side thereof a combined cutter and fly wheel 103 which is fixed to the crank shaft 104 of an engine or power member 105. The combined cutter and fly wheel 103 includes an upper relatively thick plate 106 which has secured to the lower side thereof by fastening means 107 a blade clamping plate 108. A plurality of radially disposed blades or wires 109 are interposed between the two plates 106 and 108 and extend radially from the marginal edges thereof. The plate 106 is formed on the upper side thereof with a plurality of fan blades 110 which are adapted to draw air from above through openings 111 formed in the plate 85 and force this air downwardly below the frame 84. The draft of air created by the blades 110 will not only provide for cooling of the engine 105 but will also provide for cleaning of the wires or blades 109.

The frame 84 has fixed to the lower side of the plate 85 thereof an arcuate depending guard or baffle 112 which extends loosely about the fan blades 110 at the forward side of the frame so that the grass will not contact the blades 110, and to form a proper shape shroud for the cooling fan to direct the steam of air to the rear.

A lower guard generally designated as 113 is disposed on the lower side of the frame 84 below the cutter 103 and includes a horizontally disposed bar 114 formed with upturned opposite ends 115 which are fixed by fastening means 116 to the flange 86. The bar 114 has extending forwardly therefrom lower bars 117 having upturned forward ends 118 and rearwardly extending bars 119 extending from the upturned forward ends 118 and are fixed to an arcuate plate 120 which is secured by fastening means 121 to the upper side of the plate 85 at the forward portion of the latter. The engine 105 is enclosed by a cover 122 similar to the cover 62 and the cover 122 is formed with louvers 123 in the upper side thereof and also with louvers 124 in the rear side thereof.

A handle 125 having secured to the lower forward end thereof a pair of divergent or bowed bars 126 is rockably mounted on a pair of pivot bolts 127 extending through upwardly extending ears 128 carried by the plate 85 on the opposite sides of the cover 122. The bars 126 are provided with stop lugs 129 engageable with the upper side of the guard 84 so as to limit the rocking of the handle 125.

Referring now to Figures 13 to 15, inclusive, there is disclosed another modified form of the invention embodying the use of an electric motor or power member. A frame 130 is provided which is similar to the frame 84 and the frame 130 is movably supported on a pair of front wheels 131 adjustably carried by arms 132 similar to the arms or forks 88. The arms or forks 132 are vertically adjusted by the same means as disclosed with relation to the forks 88 in Figure 6. A rear caster wheel 133 is rotatably carried by a fork 134 journalled in a bearing 135 similar to the bearing 97. The bearing 135 has extending downwardly and forwardly therefrom a supporting arm 136 which engages a boss 137 similar to boss 101. The adjusting means for adjusting the angle of arm 136 with respect to the frame 130 is the same as shown for fork 98 in Figure 6. The frame 130 has rotatably disposed in the lower side thereof a cutter 138 which includes an upper plate 139 having fixed thereto a lower plate 140. The lower plate 140 constitutes a clamping plate for clamping a plurality of radially arranged cutting blades or wires 141 to the upper plate 139. An electric motor 142 is disposed on the upper side of the frame 130 and includes a motor shaft 143 extending through an opening 144 formed in the center of the frame 130. The upper plate 139 of the cutter 138 includes a boss 145 within which the shaft 143 engages and the shaft 143 is locked relative to the boss 145 by means of a key 146 and a set screw 147.

The frame 130 has fixed to the lower side thereof a guard 148 and includes an arcuate plate 149 fixed to the upper side of the frame 130. A handle 150 is rockably secured to the motor 140 and includes a fork 151 having a sleeve 152 within which the handle member 153 is secured. The fork 151 is rockably secured to pivot members 154 which engage the lower portion of the motor 142. The handle 150 is limited in its rocking movement by means of an elongated link 155 formed with an elongated slot 156 through which a bolt or pin 157 engages. The bolt or pin 157 is carried by a pair of bushings 158 fixed to a plate 159 engaging on the upper side of the bearing bushing 135. The link 155 at its upper forward end is pivotally secured to a bolt 160 and engages between a pair of ears 161 by a clamping strap 162 which extends about the handle member 153.

In the use and operation of this lawnmower and referring first to Figures 1 to 5, inclusive, the cutter 57 is rotated at a relatively rapid rate by the engine 61. The device is moved over the surface of the ground and as the grass enters between the guard bars 69 the grass will be cut by the rapidly rotating wire blades 60. The horizontal lower guard bars 74 will prevent any obstructions such as stones, sticks or the like from striking the rotary cutter 57 as the device is moved over the surface of the ground.

The forms of the invention shown in Figures 6 to 15, inclusive, will operate in the same manner as the forms shown in Figures 1 to 4, with the exception that the electric motor shown in Figures 13 to 15 will be connected through a long conductor to a service outlet. Where the internal combustion engine shown in Figures 1 to 12, inclusive, is used, the lawnmower is not limited in its movement as is the electric mower shown in Figures 13 to 15. By providing a horizontally disposed internal combustion engine the lawnmower will present a compact appearance and through the use of light-weight metals the mower can be produced in a relatively light weight over-all so that it can readily be moved over the surface of the ground.

I claim:

1. In a powered lawnmower having a flat frame, traction wheels carried by said frame, and a power member carried by said frame having a vertical drive shaft, a cutter member fixed to said shaft and disposed below said frame, said cutter member comprising an upper plate fixed to said shaft, a lower clamping plate, a plurality of radially disposed elongated resilient wire blades having the inner ends thereof immovably secured between said plates, and means securing said plates together, and a cutter member guard fixed to said frame.

2. A powered lawnmower comprising a flat disc frame, a depending flange on the side and rear edges of said disc, a power member on said frame having a vertical drive shaft extending through said disc, a cutter member rotatable below said disc and above the lower edges of said flange, said cutter member including a hub portion fixed on said shaft and a lower clamping plate, a plurality of radially disposed elongated resilient wire members having the inner ends thereof immovably attached to said hub portions by said clamping plate, and a cutter member guard carried by said frame below said cutter member and extending over the cutter member at the forward open end of the frame.

3. A power lawnmower comprising a flat disc frame, a depending flange on the side and rear edges of said disc, a power member on said frame having a vertical drive shaft extending through said disc, a cutter member rotatable below said disc and above the lower edges of said flange, said cutter member including a hub portion fixed on said shaft and a lower clamping plate, a plurality of radially disposed elongated resilient wire members having the inner ends thereof immovably attached to said hub portions by said clamping plate, said elongated wires extending radially in a horizontal plane, and all of said wires being in the same plane and equidistantly spaced in balanced relation.

GEORGE W. DAGGETT.

REFERENCES CITED

The following references are of record in the file of this patent:

UNITED STATES PATENTS

| Number | Name | Date |
| --- | --- | --- |
| 450,584 | House | Apr. 14, 1891 |
| 488,667 | Stewart | Dec. 27, 1892 |
| 1,336,257 | Muzzy | Apr. 6, 1920 |
| 1,744,597 | Vasconcellos | Jan. 21, 1930 |
| 1,823,215 | Seal | Sept. 15, 1931 |
| 1,868,347 | Cloud | July 19, 1932 |
| 1,868,918 | Schenk | July 26, 1932 |
| 1,880,154 | Rotondo et al. | Sept. 27, 1932 |
| 1,899,564 | Frey | Feb. 28, 1933 |
| 1,980,205 | Isola | Nov. 13, 1934 |
| 2,071,872 | Cockburn | Feb. 23, 1937 |
| 2,198,526 | Cockburn | Apr. 23, 1940 |
| 2,200,368 | Iverson | May 14, 1940 |
| 2,250,948 | Garst | July 29, 1941 |
| 2,263,368 | Sejkora | Nov. 18, 1941 |
| 2,491,955 | Coats | Dec. 20, 1949 |
| 2,504,365 | Wallace | Apr. 18, 1950 |

FOREIGN PATENTS

| Number | Country | Date |
| --- | --- | --- |
| 205,310 | Great Britain | Oct. 18, 1923 |